United States Patent [19]

Spanoudis

[11] 4,334,523
[45] Jun. 15, 1982

[54] SOLAR ENERGY COLLECTOR HAVING SOLAR SELECTIVE COATING OF LOW REFLECTANCE

[75] Inventor: Louis Spanoudis, Toledo, Ohio
[73] Assignee: Owens-Illinois, Inc., Toledo, Ohio
[21] Appl. No.: 162,220
[22] Filed: Jun. 23, 1980
[51] Int. Cl.³ .................................................. F24J 3/07
[52] U.S. Cl. ................................... 126/443; 126/901; 350/1.7; 428/615; 428/620; 428/650
[58] Field of Search .................... 126/901, 443, 900; 350/1.7; 428/620, 615, 650, 660, 666, 651

[56] References Cited

U.S. PATENT DOCUMENTS

| | | | |
|---|---|---|---|
| 3,176,679 | 4/1965 | Langley | 126/901 |
| 3,272,986 | 9/1966 | Schmidt | 126/901 |
| 3,920,413 | 11/1975 | Lowery | 126/901 |
| 4,029,480 | 6/1977 | Warren | 126/901 |
| 4,033,327 | 7/1977 | Pei | 126/901 |
| 4,055,707 | 10/1977 | MacDonald | 126/901 |
| 4,087,288 | 5/1978 | Reid | 126/901 |
| 4,090,496 | 5/1978 | Mallet | 126/900 |
| 4,098,956 | 7/1978 | Bickenderfer | 126/901 |
| 4,105,014 | 8/1978 | Schwerzel et al. | 126/900 |
| 4,122,239 | 10/1978 | Riboulet | 126/901 |
| 4,122,831 | 10/1978 | Mahdjuri | 126/901 |

OTHER PUBLICATIONS

"High Absorptivity Solar Absorbing Coatings", by Mattox and Sowell, J. Vac. Sci. Tech. vol. 11, No. 4, Jul. 1974, pp. 793-796.
"Variable Refractive Index Optical Coatings" by Yadava et al., Thin Solid Films 17 (1973), pp. 243-252.

*Primary Examiner*—Albert W. Davis
*Assistant Examiner*—G. Anderson
*Attorney, Agent, or Firm*—Richard D. Heberling; Myron E. Click; David H. Wilson

[57] ABSTRACT

A solar energy collector and process for its preparation are disclosed in which the collector has a solar selective layer of overlying, multiple coatings. The first coating is a reflective metal; the second coating is a semiconductor material being absorbent in the solar spectrum; and the third coating being the coating exposed to solar radiation is a dielectric material defining an anti-reflection guard. The dielectric coating is transparent to radiation in the solar spectrum and has a relatively low refractive index. The thickness of the dielectric coating is of a magnitude to decrease reflectance from the semiconductor coating by destructive interference. The solar selective layer may be prepared by depositing the various coatings in sequence as by thermal evaporation techniques.

7 Claims, 4 Drawing Figures

SOLAR ENERGY COLLECTOR HAVING SOLAR SELECTIVE COATING OF LOW REFLECTANCE

BACKGROUND OF THE INVENTION

The present invention relates to a solar energy collector having an improved absorbing layer of multiple coats which results in reduced energy loss through reflectance.

Realization that the fossil fuel supply of the world is finite and may be rapidly depleted at the present rate of national energy consumption has led to a search for substitute energy resources. Use of solar radiation is one possibility for providing clean and reliable energy.

Solar energy is an extensive, constant energy source whose economic feasibility depends on efficient collection, retention, and utilization. The efficiency of some solar collecting systems has been low due to excessive heat losses. One area in which improvement has been sought is in solar selective absorber coatings, that is, coatings which absorb energy particularly well in the solar spectrum. For example, such coatings are designed to collect thermal energy from exposure to solar radiation and then transmit the collected energy through other media either to heat or cool homes and buildings through heat exchangers.

In general, when radiant energy from the sun impinges on a cooler object, part of the energy is reflected and lost and the balance either absorbed or transmitted away. The absorbed energy may be re-radiated at a longer wavelength. Accordingly, a coating which absorbs in the range of solar radiation becomes heated, provided the surface does not re-radiate or emit most or all of the energy collected.

Solar radiation reaching the surface of the earth is almost entirely confined to the range of 0.3 to 2.5 microns. It is estimated that about 90% of solar radiation is at wavelengths of about 0.4 micron to about 1.5 microns. The amount of radiation above 2.5 microns is negligible. Solar energy selective coatings, therefore, are designed to differentiate in their absorption, reflection or transmission characteristics between wavelengths above about 2.5 microns and wavelengths below about 2.5 microns. Thus, solar energy can be collected at wavelengths below about 2.5 microns and the collected energy then transferred to useful application at wavelengths above about 2.5 microns.

This also means that for reflective collection and retention, a solar collector should absorb strongly at wavelengths below about 2.5 microns and not radiate at wavelengths greater than 2.5 microns. A coating which has a high absorptivity, usually termed alpha, in the solar spectrum but a low emissivity, epsilon, at the temperature at which the collector operates may be called a solar selective coating. Even though a high alpha to epsilon ratio is desirable, it is essential that the alpha value be near one to collect as much of the available energy as possible.

Solar selective coatings are one important way to increase the efficiency of solar energy collectors, primarily by maximizing the absorption of solar energy and minimizing the energy lost by radiation. However, solar selective coatings can still suffer from serious shortcomings which adversely affect their efficiency. One of these shortcomings is the relatively high degree of reflectance of the coating. In solar energy collectors the energy lost due to reflection can represent a significant loss in system performance and therefore an appreciable reduction in overall efficiency.

SUMMARY OF THE INVENTION

An object of the invention is to provide an improved solar energy collector. Another object is to provide a solar selective layer for a collector comprising multiple coatings. A related object is to provide a solar selective layer having decreased losses through reflectance.

These and other objects are realized by the joint action of three, distinct coatings arranged in a predetermined laminar order to define a solar selective layer. The first coating of the layer which overlies a substrate is a reflective metal such as silver. The second coating which overlies the first is of a semiconductor material such as black chrome. The third coating which overlies the second and is the outer coating exposed to the solar radiation is of a dielectric material such as magnesium fluoride.

Each coating performs a designated function. The reflective metallic first coating contributes by its low emissivity and reflects solar energy which penetrates the layer back to the overlying second semiconductor coating which is highly absorbant in the solar spectrum. However, semiconductor materials normally have high reflectance losses. The third dielectric coating serves as an anti-reflectance guard for the other two coatings and especially the semiconductor coating. The dielectric coating is transparent to radiation in the solar spectrum and has a relatively low refractive index compared to the refractive index of the semiconductor coating. The thickness of the dielectric coating is of a magnitude to decrease reflectance from the semiconductor coating by destructive interference.

The dielectric coating operates as an optically-interfering medium. It causes the reflected solar energy waves to be thrown out of phase and the reflection reduced by destructive interference in which waves out of phase cancel each other. As a result, the reflectance of the first and second coatings is reduced materially, and the absorption of the coatings and particularly the semiconductor coating is materially increased. Preferably, the destructive interference is designed to be most effective at the maximum absorption band of the two underlying coatings in the solar spectrum.

The effectiveness of the optically-interfering dielectric outer coating can be improved by providing it with a refractive index which is substantially below the refractive index of the semiconductor coating and which preferably is approximately equal to the square root of the refractive index of the semiconductive coating. The effectiveness of the dielectric coating may also be improved by providing it with a thickness conducive to the destructive interference, for example, a thickness approximately equal to one fourth of the wavelength of the solar spectrum radiated upon the solar collector.

The present solar selective layer may be prepared by depositing the coatings in the order described by known thermal evaporating techniques.

DESCRIPTION OF THE PREFERRED EMBODIMENTS

Figure 1:
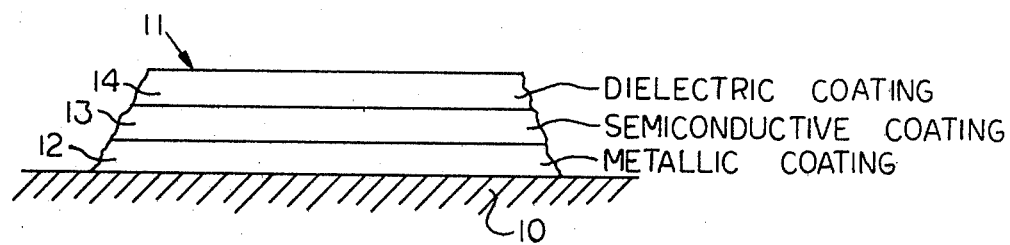
FIG. 1 is a fragmentary, highly magnified, cross-sectional view of a solar selective layer of the present invention on a substrate.

Each of the three coatings that define in laminar form the present solar selective layer is described in detail, followed by a description of the preparation of the layer and its operation upon exposure to solar radiation. Examples of solar collectors embodying the present layer are described as well as specific tri-coating combinations and the decrease in reflectance obtained by them as compared to solar selective coatings not of the present invention.

The present solar selective layer comprises three distinct coatings arranged in juxtaposition in a predetermined order. Arbitrarily selecting for discussion the coatings in a direction away from a supporting substrate, what is herein called the first coating is that of a highly reflective metal and especially one having high reflectance and low emissivity in the infrared spectrum. Useful metals have good heat exchange properties. For example, the reflective metal preferably has a reflectance at least 90% at a wavelength of light of 7300 nonameters.

While various metals can be used, those of aluminum, silver, copper, gold, molybdenum, stainless steel, chromium, nickel and alloys thereof have been found especially useful, particularly when in a chemically reduced metallic state. These metals have relatively low emissivities, particularly when highly polished. Low emissivity is desirable if a solar collector is to reach a relatively high equilibrium temperature. Nevertheless, these metals absorb little solar energy and solar collectors using only these metals would not have an equilibrium temperature sufficiently high to be practical. Aluminum has a further limitation in that it has a relatively low melting point. Silver and copper are subject to tarnishing which increases emissivity.

The first coating of the reflective metal can comprise a substrate or base, such as a plate, that is composed entirely of the metal. Or the first coating can comprise a non-metallic substrate that is conventionally covered or metallized by the reflective metal. A typical non-metallic substrate that can be used is glass, especially for tubular collectors as hereinafter described. The composition of the glass is not critical and may comprise a soda-lime glass or a borosilicate glass. Other non-metallic substrates that may be used include porcelain, refractory materials, organic polymeric materials, and the like.

The second coating is a semiconductor material that absorbs strongly in the solar spectrum and that is essentially transparent in the infrared spectrum. Semiconductor materials qualifying for this role normally have high refractive indicies which cause high reflection losses. As used here and in the claims, the term "semiconductor" is taken to mean a material as defined by the "American Institute of Physics Handbook", second edition, 1963, page 9-31, namely, a material in which the highest occupied energy bond (valence bond) is completely filled at absolute zero; and in which the energy gap between the valence bond and the next higher bond (conduction bond) is of the order of 0.4 to 5 electron volts.

In general, incompletely oxidized oxides of the transitional metal elements provide the best results and are therefore preferred as the semiconductor materials. Specific semiconductor materials useful for the second coating include black chrome, black nickel, black platinum, black molybdenum, black copper, black iron, black cobalt, black manganese, and compatible alloys thereof. Black chrome is a mixture of the oxides of chromium and is designated in the art as $CrO_x$. Similarly, black nickel is a mixture of the oxides of nickel. Black platinum, black molybdenum, black copper, black iron, black cobalt, and black manganese are oxides of these metals.

However, the semiconductor material can be other than metal oxides. For example, carbides of the same and other metals having semiconductor properties may be used, such as copper carbide, hafnium carbide, nickel carbide, and the like. Also, sulfides of the same and other metals having semiconductor properties may be similarly used, such as silver sulfide, iron sulfide, manganese sulfide, and the like.

Still further, elemental metals like silicon and germanium can be used as the semiconductor material.

The third coating is essentially a dielectric material that is transparent in the solar spectrum and has a relatively low refractive index. The third coating is applied in such a thickness as to decrease reflectance of the first and second coatings and particularly the second coating by destructive interference. Materials found especially useful for the dielectric third coating include magnesium fluoride, magnesium oxide, silicon dioxide, alumina, tantala, and the like, of which the first three are preferred. By "dielectric" is meant a material non-conductive to electricity, for example, a material having an electric resistivity of at least 50,000 ohms.

The three coatings may be applied to a substrate in the order described in any convenient manner, such as by vapor deposition, vacuum deposition, sputtering, flame spraying, and the like, depending in part on the material to be applied. The best mode presently known is to use the known thermal evaporating techniques. Two such techniques which have been successfully used for the deposition of materials herein contemplated include the resistance heating boat technique and the electron beam technique.

Referring to other properties of the three coatings inter se, all of the coatings are relatively thin, ranging from as little as 250 angstroms to as much as about 2000 angstroms, except when the metallic first coating comprises a relatively thick substrate composed entirely of the metal itself. In general, the first coating may range from about 500 angstroms to about 1000 angstroms, and the second coating may range from about 250 angstroms to about 750 angstroms.

The thickness of the third anti-reflective coating is correlated to that of the second coating in order to provide the destructive interference with reflectance from that coating. Preferably, the destructive interference is designed to be most effective at the maximum reflectance band of the first two coatings in the solar spectrum.

More particularly, the dielectric third coating that provides the optical interference is a material capable of transmitting energy at wavelengths from about 0.4 microns to about 1.5 microns. The wavelength range of 0.4 to 1.5 microns is significant as being that range in which most of the sun's energy is emitted. But it is also important that the outer third coating transmit the higher wavelengths of 1.5 microns to 15 microns for the reason that, if it did not do so, the coating would absorb these wavelengths and become a high emittance surface which would be undesirable for the purposes intended. The third coating is an anti-reflection guard. It transforms reflected light waves and incoming light waves to out-of-phase relation by approximately one-half a period or wavelength so that they tend to cancel one another.

With these factors in mind, the third coating preferably ranges from about 0.1 micron to about 0.4 micron in thickness. In the preferred embodiment, the thickness is approximately equal to one fourth of the wavelength of the solar spectrum radiated upon the solar selective layer.

In another aspect of the present solar selective layer, the index of refraction of the dielectric third coating should be substantially less than that of the semiconductor second coating. In general, the dielectric third coating may have a refractive index of about 1.3 to about 1.8. Those three preferred materials for the outer third coating have these approximate refractive indices:

|  | Refractive Index |
| --- | --- |
| Magnesium Fluoride | 1.380 |
| Magnesium Oxide | 1.736 |
| Silicon Dioxide | 1.480 |

As a rule, in a preferred embodiment, the dielectric third coating has a refractive index approximately equal to the square root of the refractive index of the semiconductor coating.

It has been described that the semiconductor materials of the second coating have high refractive indices which cause high reflection losses. In one specific instance where black chrome comprised the second coating, it had a refractive index of approximately 2.551. The reflection loss from this coating was relatively high at 19.1%. In a preferred embodiment, then, the third coating used over black chrome would have a refractive index of about 1.597.

The present tri-coating solar selective layer can be used in any type of solar collector system. It is necessary suitably to support the first coating and to direct the third coating toward the solar radiation. Accordingly, the present solar selective layer can be incorporated in a flat plate collector, such as a flat composite panel, a glass tubular collector, and the like.

Figure 2:
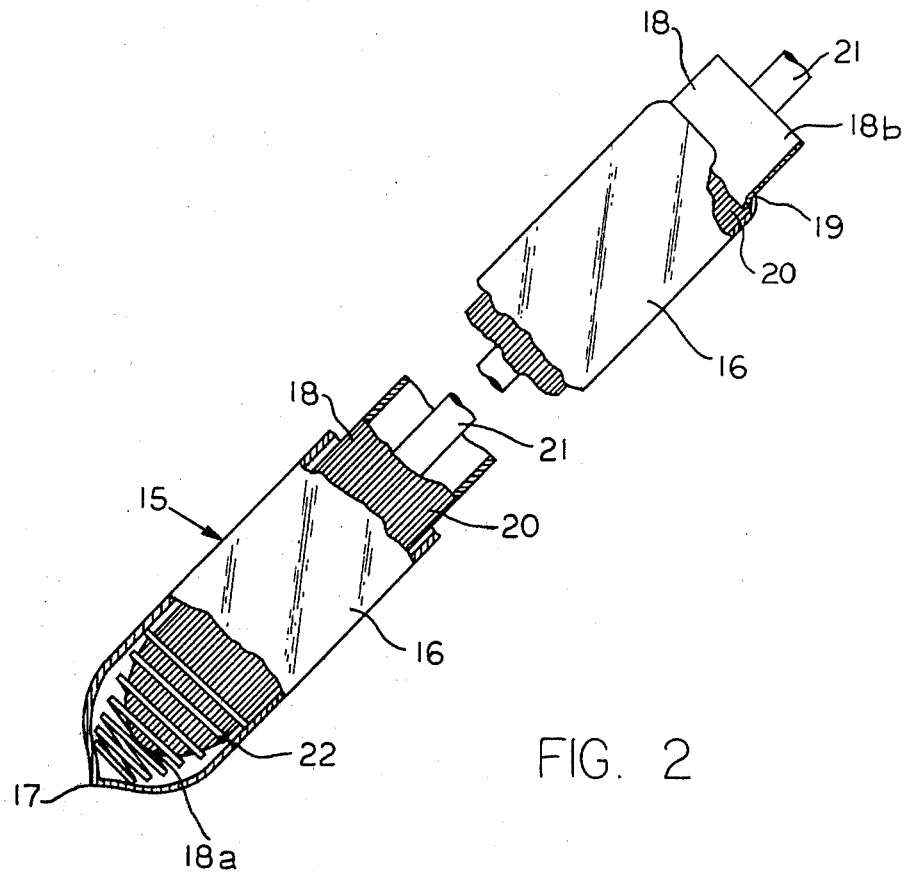
FIG. 2 is a side elevational view, partly in section, of a tubular solar energy collector having a solar selective layer of the present invention.

FIGS. 1 and 2 illustrate two collector systems that can contain the present solar selective layer. FIG. 1 semischematically shows a panel that is part of a flat plate. A substrate 10, which can be glass, metal, plastic, ceramic, and the like supports an overlying layer generally represented at 11. The layer comprises a first coating 12 of a reflective metal, a second coating 13 of a semiconductor material, and a third coating 14 of a dielectric material.

FIG. 2 illustrates a double-wall, glass tubular collector of the type described in U.S. Pat. No. 4,033,327 to Y. K. Pei. This embodiment includes a collector generally represented at 15 comprising concentric, transparent glass tubes. An outer or cover tube 16 is circumferentially transparent, open at the right hand end, as viewed in FIG. 2, and closed at the opposite end when tipping off the tubulation as at 17. The open end of cover tube 16 is sealed to an inner glass absorber tube 18 by a glass-to-glass hermetic seal at 19. The sealed space between the tubes 16 and 18, respectively, is evacuated to a hard vacuum (e.g. $10^{-4}$ to $10^{-6}$ Torr) and the tubulation 17 is sealed off in a known manner.

Absorber tube 18 is preferably made of glass and has a lesser outside diameter and slightly greater length than the inside diameter and length, respectively, of cover tube 16. Tube 18 is closed at end 18a and opened at the opposite end 18b. Prior to assembly, the exterior peripheral glass surface of absorber tube 18 is coated with the energy absorbing, solar selective layer of the present invention which is illustrated in FIG. 2 by the shaded area 20. In one example of such a tubular collector, a central feeder tube 21 of smaller diameter than tube 18 may be inserted into open end 18b of the absorber tube to extend longitudinally of concentric tubes 16 and 18 to a point near the closed end 18a of absorber tube 18. End 18a nests within a coiled spring 22 which resiliently retains that end of tube 18 in place. The open end 18b of the absorber tube together with the open end of feeder tube 21 seat in a sealed relation within a manifold (not shown) which carries a number of collector tube assemblies like that illustrated by FIG. 2. In operation, a fluid circulates from the manifold, through tube 21, the annular area between tube 21 and tube 18 and then back to the manifold to remove heat energy collected in collector 15. Another example of fluid circuit in an operating tubular collector of this type is shown in U.S. Pat. No. 4,120,285.

However the present solar collector layer is employed, its operation in harnessing solar energy is the same. Solar radiation impinging on the layer is transmitted through the layer and reflected off the metallic first coating. As radiation continues, the temperature of the first coating rises. If left uncovered, the metallic coating would reach a temperature where it radiated so much heat, as compared to the radiation it receives, that the operation would have low efficiency as a solar collector.

The presence of the second semiconductor coating helps retain the heat energy of the first coating and appreciably prevents this radiation loss by substantially absorbing the reflectance and further contributes by its unique absorbing qualities to absorb energy directly from the solar radiation.

However, the semiconductor second coating by its nature has high reflectance losses. This loss is considerably restrained by the present invention in which the dielectric third coating interferes destructively with the reflected light and thereby reduces energy loss which otherwise would escape in this manner. Where known solar collectors reflect between 20% and 30% of the solar spectrum, the present invention reduces this loss to 10% or less.

The following examples only illustrate the invention and should not be construed as imposing limitations on the claims.

EXAMPLE 1

A glass microscope slide was coated first with silver in a vacuum chamber then with chromium oxide, both depositions being by standard thermal evaporation techniques. The chromium oxide was applied by evaporating chromium oxide under a slight partial pressure of air. The resulting silver and chromium oxide coatings had thicknesses of about 1000 angstroms and about 800 angstroms, respectively. The microscope slide was thereafter removed and placed in a second vacuum chamber where a coating of magnesium oxide was supplied having in a thickness of about 830 angstroms to form a tri-coating layer of the present invention.

Figure 3:
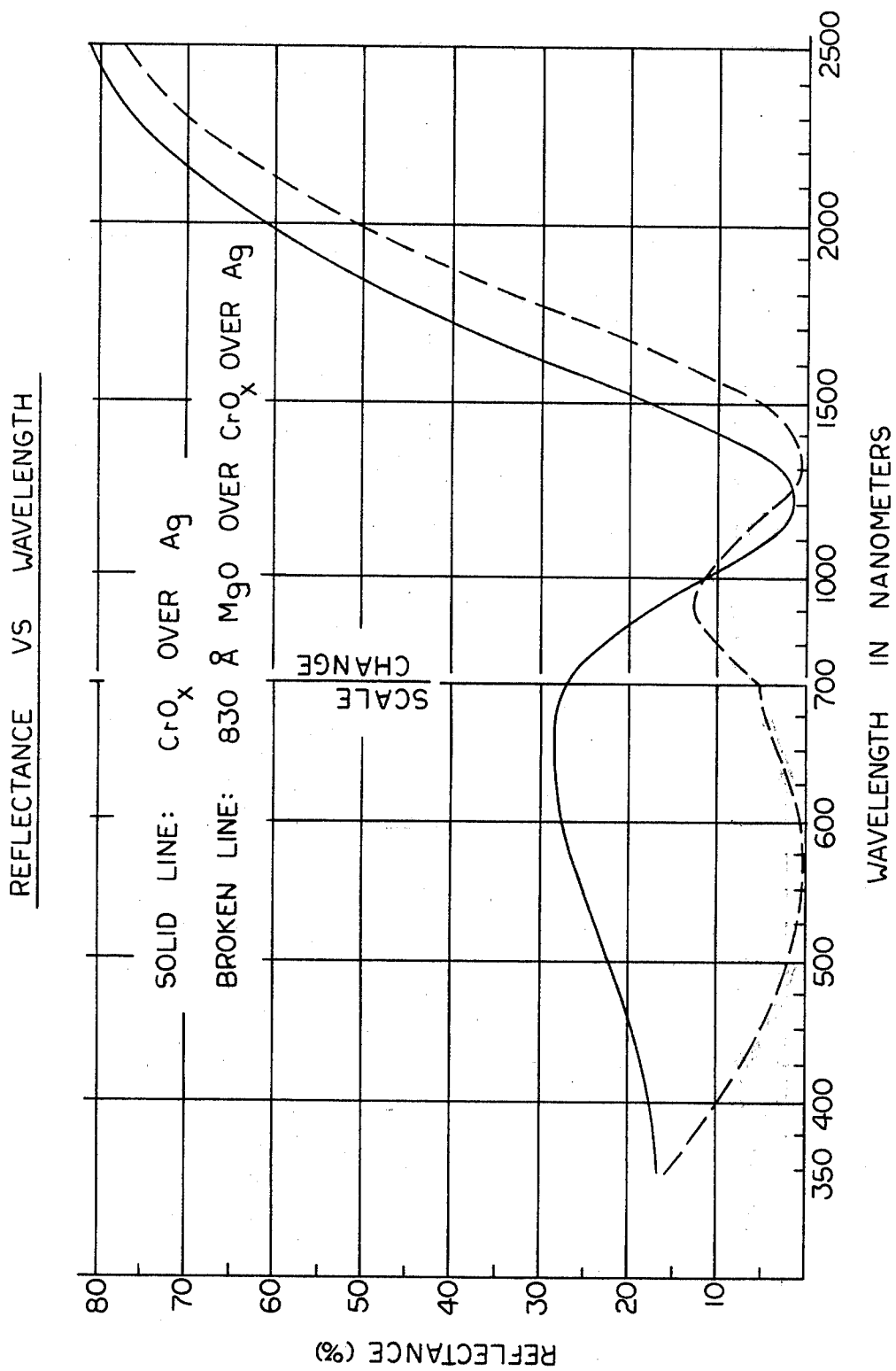
FIG. 3 is a graph of spectral reflectance curves of two solar selective layers, including one of the present invention, and illustrates the decreased reflectance obtained by the present selective layer in visible solar spectrum.

FIG. 3 compares the spectral reflectance curves of this layer, represented by the broken line, with one for a layer consisting only of chromium oxide over silver, represented by the solid line. FIG. 3 includes reflectance spectra from a wavelength of about 350 nanometers to about 2500 nonameters. Of this range a wavelength of about 350 nanometers to about 700 nanometers represents the visible solar spectrum, while that above 700 nanometers represents the infrared.

The superiority of the present solar selective layer (broken line) over the other layer in affording reduced reflectance is clearly evident in the range of about 350 nanometers to about 900 nanometers. In particular, it will be noted that the present solar selective layer decreases the reflectance spectra from about 26% to 0 at 550 nanometers which is the peak energy flux of the solar spectrum.

EXAMPLE 2

A procedure was carried out like the procedure of Example 1 except that the three coatings applied on a glass microscope slide were, in order of deposition, aluminum, black chrome, and silicon dioxide. The thicknesses of the resulting coatings were about 800 angstroms, about 900 angstroms, and about 970 angstroms, respectively. In this case, reflectance spectra of the slide were determined before and after application of the third coating.

Figure 4:
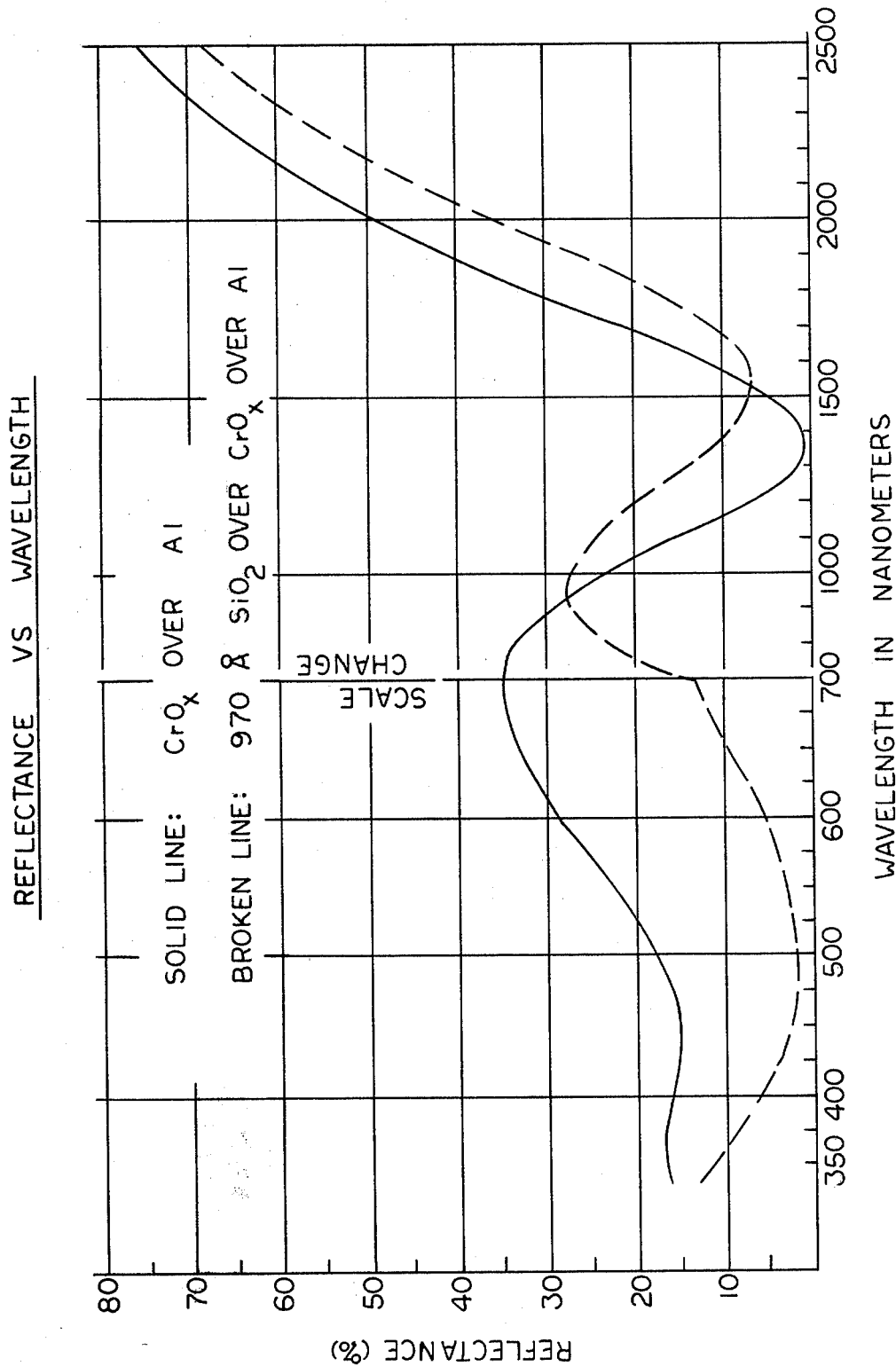
FIG. 4 is a graph like FIG. 3 and shows the enhanced results obtained by including a topmost coating of a dielectric material in decreasing reflectance in the visible solar spectrum.

In FIG. 4, the solid line represents the reference spectra of the slide before silicon dioxide was applied, and the broken line represents the reference spectra of the slide after deposition of the silicon dioxide. As before, the silicon dioxide third coat caused a pronounced decrease in the reflectance from about 350 nanometers to about 900 nonameters.

In the drawing the three coatings of the present solar selective layer are shown in the preferred arrangement of intimate contact with each other which produces the best results. However, it is understood that other intervening coatings of other materials can be tolerated where their presence does not sufficiently adversely affect the operation and efficiency of the solar selective layer.

Although the foregoing describes several embodiments of the present invention, it is understood that the invention may be practiced in still other forms within the scope of the following claims.

I claim:

1. A solar energy absorber comprising a substrate with a multiple coating including a coating of aluminum, a coating of black chrome overlying said aluminum coating and a coating of magnesium fluoride overlying said black chrome coating, the thickness of said magnesium fluoride coating being of a magnitude to decrease reflectance from said aluminum coating by destructive interference.

2. The solar energy collector of claim 1 in which said collector comprises a flat plate absorber element.

3. The solar energy collector of claim 1 in which said collector is tubular, said selective layer being on the outer surface of the tubular absorber element of said tubular collector.

4. The solar energy collector of claim 3 in which the absorber element is tubular and housed within an outer transparent tube of said tubular collector.

5. The solar energy collector of claim 1, 2 or 3 in which said black chrome coating has a reflectance of at least 90% of a wavelength of light of about 7300 nonameters.

6. A solar energy absorber having a solar selective layer of multiple coatings on a substrate, said coatings comprising:
    (a) a first coating of aluminum;
    (b) a second coating overlying the first coating and comprising black chrome having at least a 15% reflectance loss in the solar spectrum; and
    (c) a third coating overlying the second coating comprising magnesium fluoride, the thickness of said magnesium fluoride being of a magnitude to decrease reflectance from said black chrome coating by destructive interference, said magnesium fluoride coating having a refractive, index substantially equal to the square root of the refractive index of the black chrome coating and said thickness being substantially equal to one fourth of the wavelength of the solar radiation received.

7. A process for forming a solar selective layer on a substrate for a solar energy collector providing a decreased reflectance loss, said process comprising forming on a substrate a first coating of aluminum, then forming a second coating of black chrome and finally forming a third coating on the second coating of magnesium fluoride, said magnesium fluoride being transparent to radiation in the solar spectrum and having a relatively low refractive index, the thickness of said magnesium fluoride being of a magnitude to decrease reflectance from said black chrome coating by destructive interference.

* * * * *